(12) United States Patent
Yamanaka

(10) Patent No.: US 8,219,381 B2
(45) Date of Patent: Jul. 10, 2012

(54) DICTIONARY REGISTRATION APPARATUS, DICTIONARY REGISTRATION METHOD, AND COMPUTER PRODUCT

(75) Inventor: Noriko Yamanaka, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1262 days.

(21) Appl. No.: 11/691,054

(22) Filed: Mar. 26, 2007

(65) Prior Publication Data
US 2008/0077385 A1    Mar. 27, 2008

(30) Foreign Application Priority Data
Sep. 27, 2006  (JP) .................................. 2006-263117

(51) Int. Cl.
*G06F 17/28* (2006.01)
(52) U.S. Cl. ...................................... 704/2; 704/4; 704/7
(58) Field of Classification Search .................. 704/1–10
See application file for complete search history.

(56) References Cited

U.S. PATENT DOCUMENTS

| | | | | |
|---|---|---|---|---|
| 4,193,119 A | * | 3/1980 | Arase et al. ........................ | 704/2 |
| 5,091,876 A | * | 2/1992 | Kumano et al. ................... | 704/3 |
| 5,132,901 A | * | 7/1992 | Yokogawa ........................ | 704/10 |
| 5,295,068 A | * | 3/1994 | Nishino et al. ................... | 704/10 |
| 5,329,446 A | * | 7/1994 | Kugimiya et al. ................ | 704/4 |
| 6,345,245 B1 | * | 2/2002 | Sugiyama et al. ............... | 704/10 |

FOREIGN PATENT DOCUMENTS

| | | |
|---|---|---|
| JP | 05-113993 | 5/1993 |
| JP | 06-012453 | 1/1994 |
| JP | 08-287072 | 11/1996 |
| JP | 2002-032369 | 1/2002 |

OTHER PUBLICATIONS

Japanese Office Action Mailed Sep. 2, 2008 Corresponding to U.S. Appl. No. 11/691,054, filed Mar. 26, 2007.

* cited by examiner

*Primary Examiner* — Talivaldis Ivars Smits
*Assistant Examiner* — Shaun Roberts
(74) *Attorney, Agent, or Firm* — Turocy & Watson, LLP

(57) ABSTRACT

A storing unit stores therein dictionary information in which a first text in a first language is associated with a second text that is a translation of the first text into a second language. An extracting unit extracts, when an input text includes an unregistered text that is not registered as the first text in the dictionary information, the unregistered text from the input text. A translating unit translates an input similar text that expresses the unregistered text with a different text, into the second language. A registering unit registers the unregistered text in association with translated similar text on the dictionary information.

8 Claims, 14 Drawing Sheets

| JAPANESE | ENGLISH |
|---|---|
| HORAANA | CAVE |
| TOSHIBA | TOSHIBA |
| : | : |

FIG.3

| SIMILAR EXPRESSION INPUT | ☒ |

SHONYUDO ～ 301

SIMILAR EXPRESSION: | CHIKASUI DE TSUKURARETA HORAANA | ～302

FIG.4

| JAPANESE | ENGLISH |
|---|---|
| HORAANA | CAVE |
| TOSHIBA | TOSHIBA |
| SHONYUDO | A CAVE MADE BY GROUND WATER |
| : | : |

FIG.7

| JAPANESE | PART OF SPEECH | ENGLISH |
|---|---|---|
| HORAANA | NOUN | CAVE |
| TOSHIBA | COMPANY NAME | TOSHIBA |
| : | | : |

FIG.8

| PART OF SPEECH | TRANSLATION GENERATION TYPE |
|---|---|
| GEOGRAPHIC NAME | EXPRESSION CONVERSION |
| PERSONAL NAME | EXPRESSION CONVERSION |
| COMPANY NAME | EXPRESSION CONVERSION |
| OTHER PROPER NOUNS | EXPRESSION CONVERSION |
| NOUN | SIMILAR EXPRESSION INPUT |
| VERB | SIMILAR EXPRESSION INPUT |
| OTHERS | SIMILAR EXPRESSION INPUT |

FIG.9

| JAPANESE | PART OF SPEECH | ENGLISH |
|---|---|---|
| HORAANA | NOUN | CAVE |
| TOSHIBA | COMPANY NAME | TOSHIBA |
| SHONYUDO | NOUN | A CAVE MADE BY GROUND WATER |
| : | | : |

CHIKASUI DE TSUKURARETA HORAANA

DICTIONARY REGISTRATION APPARATUS, DICTIONARY REGISTRATION METHOD, AND COMPUTER PRODUCT

CROSS-REFERENCE TO RELATED APPLICATIONS

This application is based upon and claims the benefit of priority from the prior Japanese Patent Application No. 2006-263117, filed on Sep. 27, 2006; the entire contents of which are incorporated herein by reference.

BACKGROUND OF THE INVENTION

1. Field of the Invention

The present invention generally relates to a technology for registering a text of a first language in association with a text representing a translation of the text of the first language into a second language as dictionary information.

2. Description of the Related Art

In a dictionary used for performing a machine translation, an original word in an original language and a word in the other language into which the original word is translated are registered by associating with each other. When the machine translation is performed, a sentence to be translated through the machine translation often includes words that have not been registered on the dictionary.

In this case, a user is required to register the unregistered word in the original language and a new word in the other language corresponding to the unregistered word, by associating with each other, for performing the machine translation using the dictionary. Namely, the user needs to know the new word for registering the new word on the dictionary. However, the user often does not know the new word.

A technology for converting the word in the original language into a new word in the other language by converting a pronunciation of the word in the original language into an expression in another language has been developed. For example, for registering a new word in a dictionary in which Japanese words and English words are associated with one another, a pronunciation of the Japanese word is expressed in Roman character, and then, the expression in Roman character is used as the English word.

Furthermore, JP-A 2002-32369 (KOKAI) discloses a technology for automatically generating a new word in another language corresponding to the word in the original language, by combining the expression with which the pronunciation of the word in the original language is expressed in the other language with a functional word corresponding to a part of speech of the word.

It is, however, difficult for a user who uses the other language and who does not know the original language to understand the meaning of the new word generated by expressing the pronunciation of the original word using the other language, or by combining the expression with which the pronunciation of the original word is expressed in the other language with the functional word.

SUMMARY OF THE INVENTION

A dictionary registration apparatus according to one aspect of the present invention includes a first storing unit that stores therein dictionary information in which a first text in a first language is associated with a second text that is a translation of the first text into a second language; a first input unit that receives an input text in the first language; an extracting unit that extracts, when the input text includes an unregistered text that is not registered as the first text in the dictionary information, the unregistered text from the input text; a second input unit that receives a similar text that expresses the unregistered text with a different text; a translating unit that translates the similar text into the second language; and a registering unit that registers the unregistered text in association with the similar text translated into the second language on the dictionary information.

A dictionary registration method according to another aspect of the present invention includes first inputting including inputting an input text in a first language; extracting, when the input text includes an unregistered text that is not registered as a first text in the first language in dictionary information stored in a first storing unit, in which the first text is associated with a second text that is a translation of the first text into a second language; second inputting including inputting a similar text that expresses the unregistered text with a different text; translating the similar text into the second language; and registering the unregistered text in association with the similar text translated into the second language on the dictionary information.

A computer-readable recording medium according to still another aspect of the present invention stores therein a computer program that causes a computer to execute first inputting including inputting an input text in a first language; extracting, when the input text includes an unregistered text that is not registered as a first text in the first language in dictionary information stored in a first storing unit, in which the first text is associated with a second text that is a translation of the first text into a second language; second inputting including inputting a similar text that expresses the unregistered text with a different text; translating the similar text into the second language; and registering the unregistered text in association with the similar text translated into the second language the dictionary information.

BRIEF DESCRIPTION OF THE DRAWINGS

FIG. 3 is an example of a window displayed by an expression input unit shown in FIG. 1;

FIG. 4 is an example of the contents of a dictionary database shown in FIG. 1, in which an unregistered text has been added;

FIG. 7 is an example of the contents of a dictionary table according to the second embodiment;

FIG. 8 is an example of the contents of a part-of-speech correspondence table according to the second embodiment;

FIG. 9 is an example of the contents of a dictionary database shown in FIG. 6, in which an unregistered text has been added;

DETAILED DESCRIPTION OF THE INVENTION

Exemplary embodiments of the present invention are explained below in detail with reference to the accompanying drawings. The present invention is not limited to the below embodiments.

Figures 1, 2:
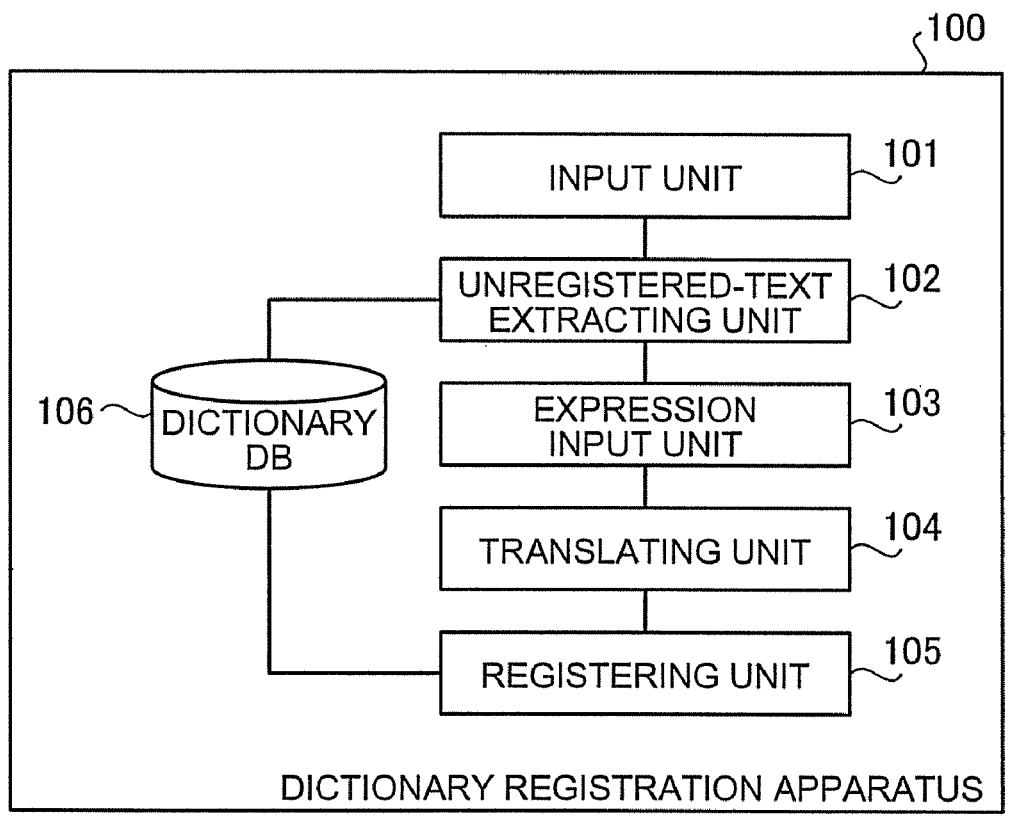
FIG. 1 is a block diagram of a dictionary registration apparatus according to a first embodiment of the present invention.
FIG. 2 is an example of the contents of a dictionary table according to the first embodiment.

As shown in FIG. 1, a dictionary registration apparatus 100 according to a first embodiment of the present invention includes an input unit 101, an unregistered-text extracting unit 102, an expression input unit 103, a translating unit 104, a registering unit 105, and a dictionary database (DB) 106. The dictionary registration apparatus 100 registers a first text in a first language that has not been registered and a second text in a second language into which a similar expression to the first text has been translated on the dictionary DB 106, by associating with each other.

The similar expression to the first text is, for example, a text including a word, an idiom, or a sentence, that expresses a meaning, an explanation, and the like with which the first text can be recognized.

According to the first embodiment, the first language is assumed to be Japanese while the second language is assumed to be English in the explanation below.

The dictionary DB 106 is a dictionary used for performing a machine translation. As shown in FIG. 2, Japanese words and English words are associated with one another in the dictionary table. Accordingly, by specifying a Japanese word, an English word associated with the specified Japanese word can be extracted.

The dictionary DB 106 can be configured using common memory units, such as a hard disk drive (HDD), an optical disk, a memory card, or a random access memory. Other databases described later can also be configured using the common memory units.

Referring back to FIG. 1, the input unit 101 receives an input of a Japanese sentence including an unregistered word that has not been registered on the dictionary DB 106. The sentence can be input via a network or an input interface (I/F) by a user. According to the first embodiment, a sentence is input as an example; however, a word, an idiom, or a text can also be input.

The unregistered-text extracting unit 102 extracts an unregistered text from the input Japanese sentence if the unregistered text that has not been registered on the dictionary table of the dictionary DB 106 is included. The text to be extracted can be any texts such as a word or an idiom.

The unregistered text extracted by the unregistered-text extracting unit 102 is output to the expression input unit 103 so that the unregistered text is added with an English translated text (second language) and registered on the dictionary table.

According to the first embodiment, the unregistered text is extracted by the unregistered-text extracting unit 102 by searching the dictionary table of the dictionary DB 106 one by one using each word included in the input sentence as a keyword and automatically extracting words that have not been registered in the dictionary table. However, a process for extracting the unregistered text is not thus limited, and it is acceptable to determine a text specified by a user as the unregistered text, or to determine the entirety of an input text as the unregistered text.

The expression input unit 103 receives an input of a similar expression that expresses the extracted unregistered text, using a different text from the unregistered text. The similar expression can be input by, for example, using a window displayed on a not shown monitor for assisting a user to input the similar expression. It is assumed that the text input as the similar expression is a text structured with one or a plurality of texts that have already been registered in the dictionary table.

As shown in FIG. 3, the expression input unit 103 displays the window on the monitor for assisting the user to input the similar expression corresponding to the unregistered text. In an example shown in FIG. 3, "shonyudo" 301 is the unregistered text while a column 302 is a space in which the similar expression corresponding to the "shonyudo" 301 is to be input. By displaying the window, the expression input unit 103 assists the user to input the similar expression corresponding to a meaning or an explanation of the unregistered text. When the user inputs the text in a predetermined column of the window, the expression input unit 103 receives an input of the text as the similar expression. The text input in the column 302 can be input in Japanese (the first language).

The translating unit 104 translates the input similar expression into English (the second language). Any translation process can be acceptable.

For example, if the input similar expression received by the expression input unit 103 is "chikasui de tsukurareta horaana" expressed in Japanese, the translating unit 104 translates the similar expression into "a cave made by ground water" expressed in English.

The registering unit 105 registers the extracted unregistered text in Japanese (the first language) and the text translated into English (the second language) generated from the similar expression, on the dictionary table in the dictionary DB 106, by associating with each other. As shown in FIG. 4, the registering unit 105 registers the extracted unregistered text of "shonyudo" in Japanese and the corresponding translated text of "a cave made by ground water" in English on the dictionary table, by associating with each other.

Figure 5:
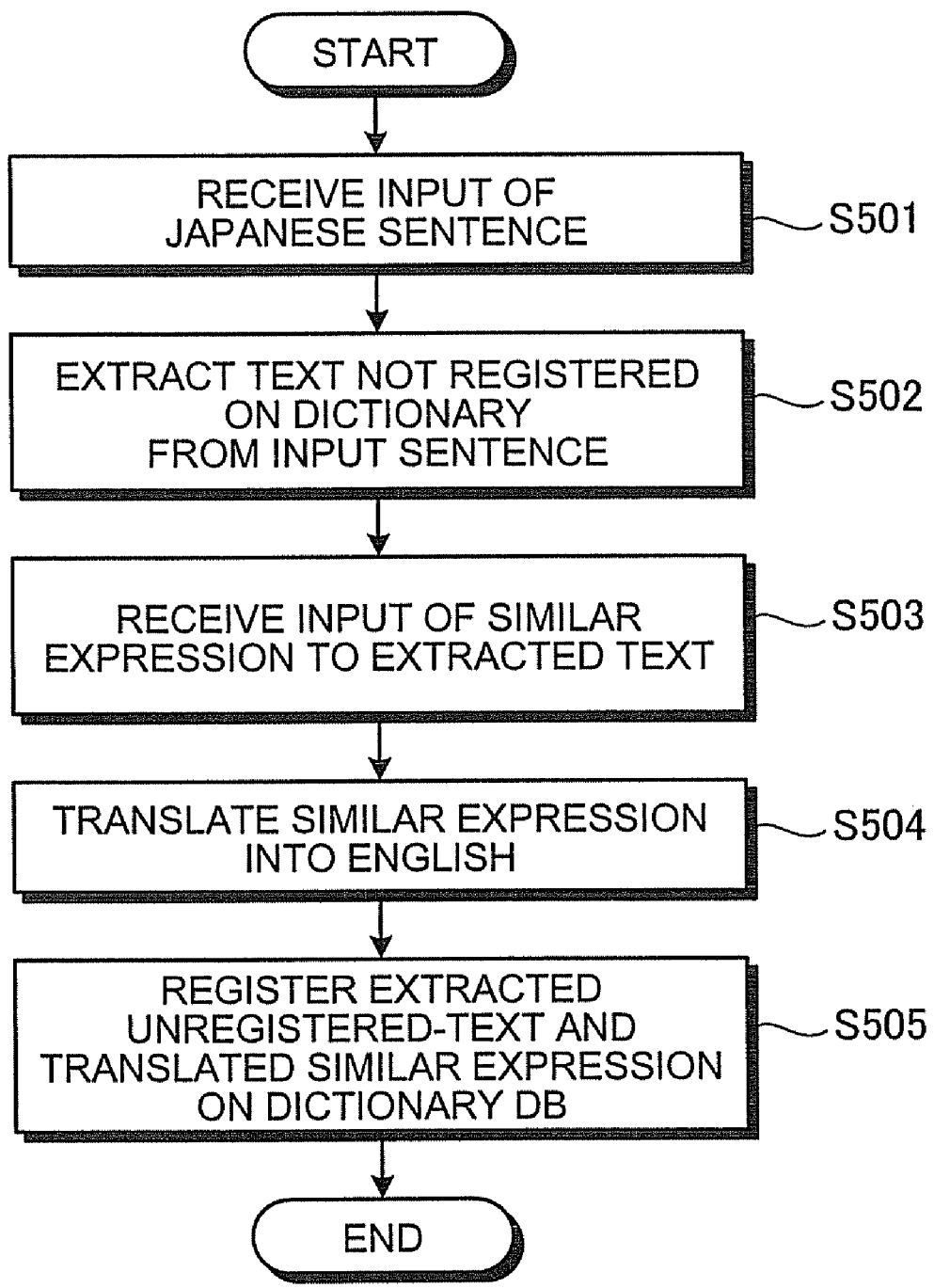
FIG. 5 is a flowchart of a registration processing of registering an unregistered text on the dictionary registration apparatus shown in FIG. 1.

A registration processing performed by the dictionary registration apparatus 100 for registering an unregistered text is explained with reference to FIG. 5.

The input unit 101 receives an input of a Japanese sentence (step S501).

The unregistered-text extracting unit 102 extracts the unregistered text including a word that has not been registered in the dictionary table of the dictionary DB 106, from the input sentence (step S502).

The expression input unit 103 receives an input of the similar expression corresponding to the extracted unregistered text (step S503). The translating unit 104 translates the input similar expression into English (step S504).

The registering unit 105 registers the extracted unregistered text and the similar expression that has been translated into English (corresponding translated text) on the dictionary table of the dictionary DB 106, by associating with each other (Step S505).

According to the first embodiment, it is explained that the single dictionary DB 106 is used. However, it is acceptable to separately set a dictionary DB for registering a new word.

Furthermore, according to the first embodiment, it is assumed that the first language is Japanese while the second language is English. However, languages as a registration target is not thus limited and any natural languages can be used.

As described above, with the dictionary registration apparatus 100, the similar expression corresponding to the unregistered text is input using the first language, and the similar expression is translated into the second language as the corresponding translated text. Accordingly, if a user who does not know a text in the second language corresponding to the unregistered text uses the dictionary registration apparatus 100, the dictionary registration apparatus 100 can generate a translated text corresponding to the unregistered text. Furthermore, because the translated text corresponding to the text of the similar expression that has been input by the user can be registered as the translated text in the second language, it is easy to register the translated text that is understandable by a user who uses the second language, on the dictionary table of the dictionary DB 106.

A dictionary registration apparatus according to a second embodiment of the present invention includes a dictionary table of a dictionary DB on which an unregistered word, a corresponding translated word, and a corresponding part of speech are registered by associating with one another. The dictionary registration apparatus according to the second embodiment determines the part of speech of the unregistered word in the first language and registers the unregistered word by associating it with each of the corresponding translated word and the part of speech, on the dictionary table of the dictionary DB.

Figure 6:
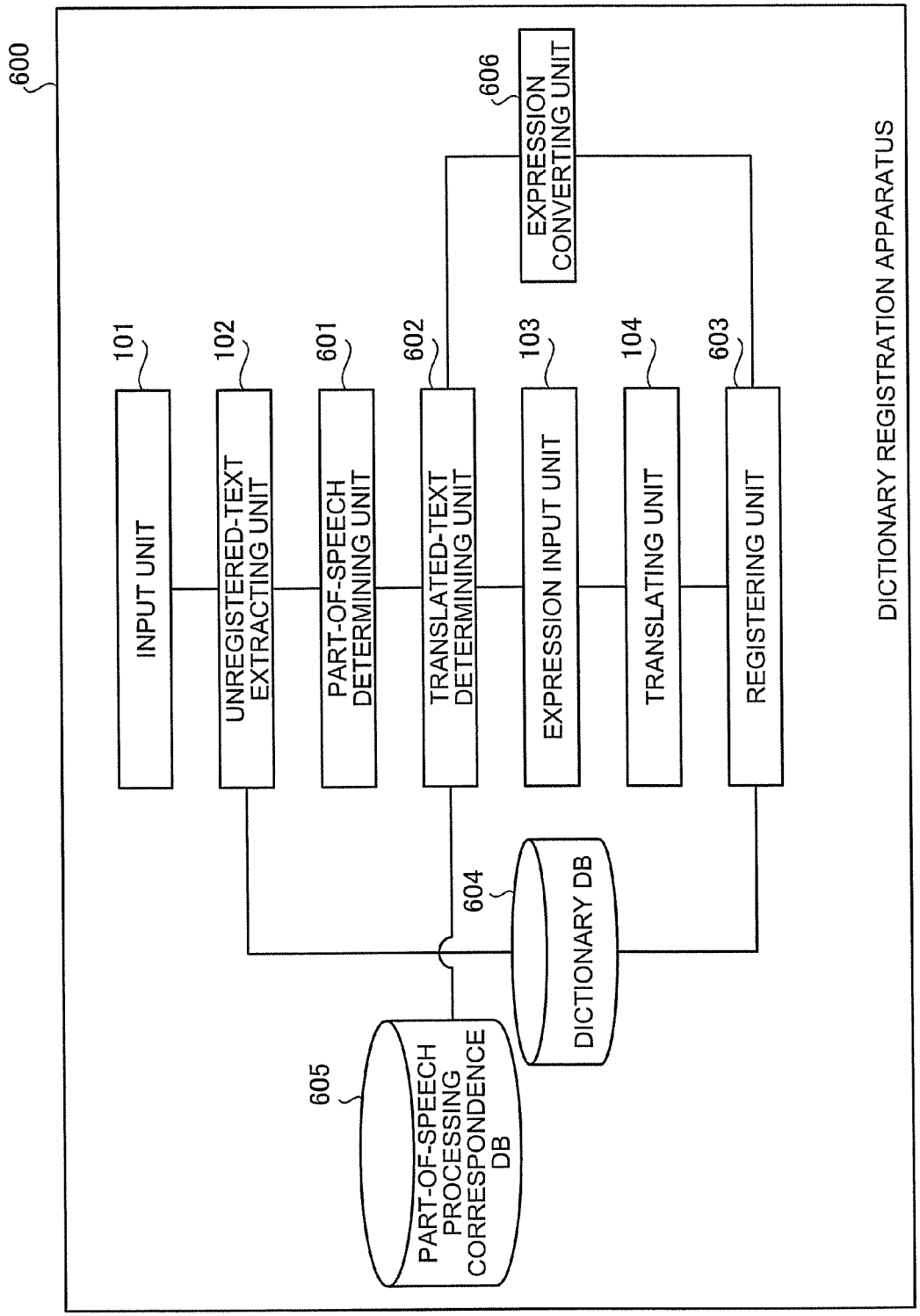
FIG. 6 is a block diagram of a dictionary registration apparatus according to a second embodiment of the present invention.

As shown in FIG. 6, a dictionary registration apparatus 600 includes the input unit 101, the unregistered-text extracting unit 102, a part-of-speech determining unit 601, a translated-text determining unit 602, the expression input unit 103, the translating unit 104, a registering unit 603, a dictionary DB 604, a part-of-speech processing correspondence DB 605, and an expression converting unit 606.

According to the second embodiment, a configuration is different from that of the first embodiment in that the part-of-speech determining unit 601, the translated-text determining unit 602, the part-of-speech processing correspondence DB 605, and the expression converting unit 606 are additionally set, the dictionary DB 106 is replaced by the dictionary DB 604 having a dictionary table with a different data configuration, and the registering unit 105 is replaced by the registering unit 603 that performs a different process. Other configurations and the functions are the same as those shown in FIG. 1 that is a block diagram of the dictionary registration apparatus 100, and therefore, the same reference numerals are assigned and explanations thereof are omitted.

The dictionary DB 604 is different from the dictionary DB 106 in that the dictionary DB 604 has a dictionary table on which the part of speech is registered. As shown in FIG. 7, in the dictionary table of the dictionary DB 604, a Japanese word, a part of speech corresponding to the Japanese word, and an English word translated from the Japanese word are associated with one another. Accordingly, a corresponding English word can be acquired by using the Japanese word and the part of speech as a key.

Referring back to FIG. 6, a part-of-speech correspondence table stored in the part-of-speech processing correspondence DB 605 registers thereon a type for generating an English translated word corresponding to the part of speech. A translation generation type for generating a translated word is determined based on the part of speech corresponding to the unregistered word, by using the part-of-speech correspondence table of the part-of-speech processing correspondence DB 605 shown in FIG. 8. In an example of the part-of-speech correspondence table shown in FIG. 8, if a part of speech is other than a proper noun such as a personal name or a geographical name, a user is required to input the similar expression. Detailed explanation will be described later.

Referring back to FIG. 6, the part-of-speech determining unit 601 determines the part of speech corresponding to the unregistered word extracted by the unregistered-text extracting unit 102. The part-of-speech determining unit 601 makes assumption about the part of speech of the unregistered word, based on the part of speech of the words arranged before or after the unregistered word in the input text, that is, based on an arrangement position of the unregistered word. Thereafter, the part-of-speech determining unit 601 determines the most optimal part of speech as the part of speech of the unregistered word. The procedure for making assumption about the part of speech based on the words before or after the unregistered word can be performed using a well-known procedure, or using others procedures. If the determined part of speech is wrong, the user can correct the part of speech. In this manner, the part-of-speech determining unit 601 makes assumption about the part of speech of the unregistered word based on the part of speech of the words before or after the unregistered word. Therefore, it is easy to determine the part of speech even if the user does not know the part of speech of the unregistered word.

The translated-text determining unit 602 determines a translation generation type of generating a translated word based on the determined part of speech, for the extracted unregistered word. According to the second embodiment, the translated-text determining unit 602 searches the part-of-speech processing correspondence DB 605 using the determined part of speech as a key, and acquires the translation generation type corresponding to the part of speech. Thereafter, the translated-text determining unit 602 determines the translation generation type whether to receive the similar expression or to perform a process for converting the expression, based on the acquired translation generation type.

For example, if the part-of-speech determining unit 601 has determined the part of speech of the unregistered word as "noun", the translated-text determining unit 602 acquires an "input of the similar expression" as the translation generation type from the part-of-speech processing correspondence DB 605 shown in FIG. 8. Accordingly, the translated-text determining unit 602 determines to receive the similar expression to the unregistered word.

In this manner, if the translation generation type is the "input of the similar expression", the part-of-speech determining unit 601 outputs the unregistered word to the expression input unit 103, and if the translation generation type is "expression conversion", the part-of-speech determining unit 601 outputs the unregistered word to the expression converting unit 606.

The expression converting unit 606 converts Japanese pronunciation of the input unregistered word into an expression in Roman character. The expression converted into Roman character is used as a corresponding English translated word.

In other words, if the determined part of speech is a proper noun, it is not effective to add a meaning or an explanation to the part of speech. In this case, it is preferable not to receive the similar expression to the unregistered word, but to convert the pronunciation of the unregistered word into an English expression (an expression of a pronunciation in the second language). Accordingly, it is configured so that the translated-text determining unit 602 determines the part of speech, and if it is not effective to add a meaning or an explanation to the part of speech, the unregistered word is to be output to the expression converting unit 606 to convert the pronunciation of the unregistered word into the English expression.

The registering unit 603 registers the extracted Japanese unregistered word, the generated English translated word, and the determined part of speech of the unregistered word on the dictionary table of the dictionary DB 604, by associating with one another. As shown in FIG. 9, if the Japanese text of "shonyudo" is added, the registering unit 603 associates the extracted unregistered Japanese text of "shonyudo" with the corresponding translated text of "a cave made by the ground water" in English and the part of speech as "noun" determined by the part-of-speech determining unit 601, and registers them on the dictionary table.

It is needles to say that the English translated word/text to be registered by being associated with each other by the registering unit 603 can be a text translated into English from the input similar expression, or can be a text converted from the pronunciation of the unregistered word into the expression in Roman character.

Figure 10:
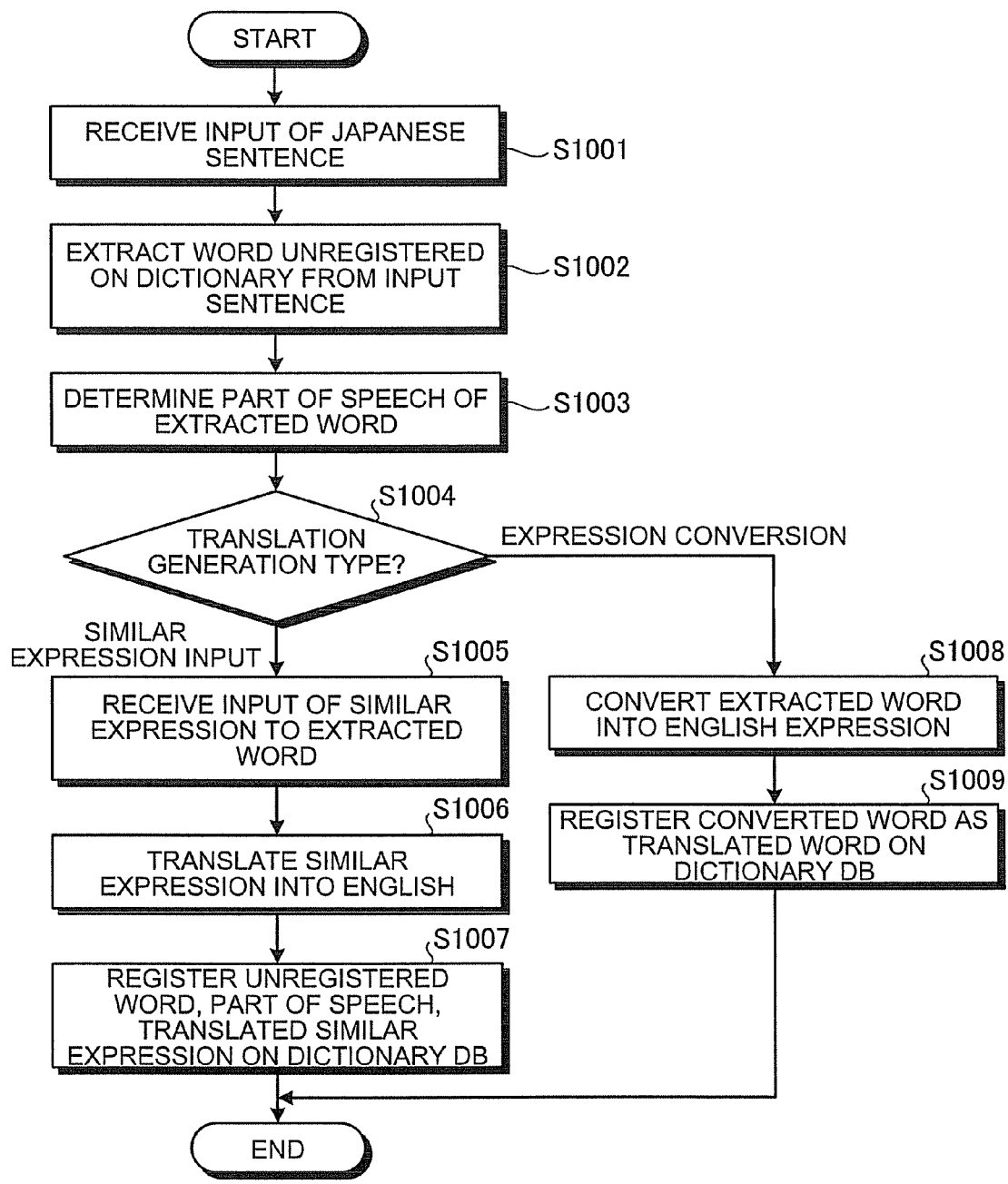
FIG. 10 is a flowchart of a registration processing of registering an unregistered text on the dictionary registration apparatus shown in FIG. 6.

A registration processing for registering the unregistered text performed by the dictionary registration apparatus 600 having the above configuration is explained with reference to FIG. 10.

The input unit 101 receives an input of a Japanese sentence (step S1001).

The unregistered-text extracting unit 102 extracts the unregistered word that has not been registered in the dictionary table of the dictionary DB 604, from the input sentence (step S1002).

The part-of-speech determining unit 601 determines the part of speech of the extracted unregistered word (step S1003). The translated-text determining unit 602 determines the translation generation type based on the determined part of speech (step S1004). The translation generation type is determined by referring to the part-of-speech correspondence table shown in FIG. 8, in which the part of speech and the translation generation type are associated with each other.

If the translated-text determining unit 602 determines the translation generation type as the "input of the similar expression", the expression input unit 103 receives an input of the similar expression corresponding to the extracted unregistered word (step S1005). The translating unit 104 translates the input similar expression into English (step S1006).

The registering unit 603 registers the extracted unregistered word, the similar expression translated into English (corresponding translated text), and the determined part of speech on the dictionary table of the dictionary DB 604, by associating with one another (step S1007).

If the translated-text determining unit 602 determines that the translation generation type as the "expression conversion", the expression converting unit 606 converts the Japanese pronunciation of the extracted unregistered word into the expression in Roman character (step S1008).

The registering unit 603 registers the extracted unregistered word, the text expressed in Roman character (corresponding English translated text), and the determined part of speech on the dictionary table of the dictionary DB 604, by associating with one another (step S1009).

According to the second embodiment, as a procedure for generating an English translated text based on the part of speech, two procedures can be employed. One is for performing a machine translation for the input similar expression while the other is for converting the pronunciation of the unregistered word into the English expression. If there are other procedures suitable for generating the English translation, they are also acceptable.

Accordingly, even if the other procedures are included to receive the unregistered word output from the translated-text determining unit 602, the present invention is not deteriorated.

According to the second embodiment, the part of speech of the unregistered word can be registered on the dictionary table of the dictionary DB 604. Accordingly, when the machine translation is performed to a sentence including an unregistered word using the dictionary DB 604, it is possible to determine whether the translated word can be used, based on the registered part of speech, and therefore, more proper translation can be performed.

A dictionary registration apparatus according to a third embodiment of the present invention is different from that of the second embodiment in that a part of speech of the unregistered word is determined by searching a database.

Figure 11:
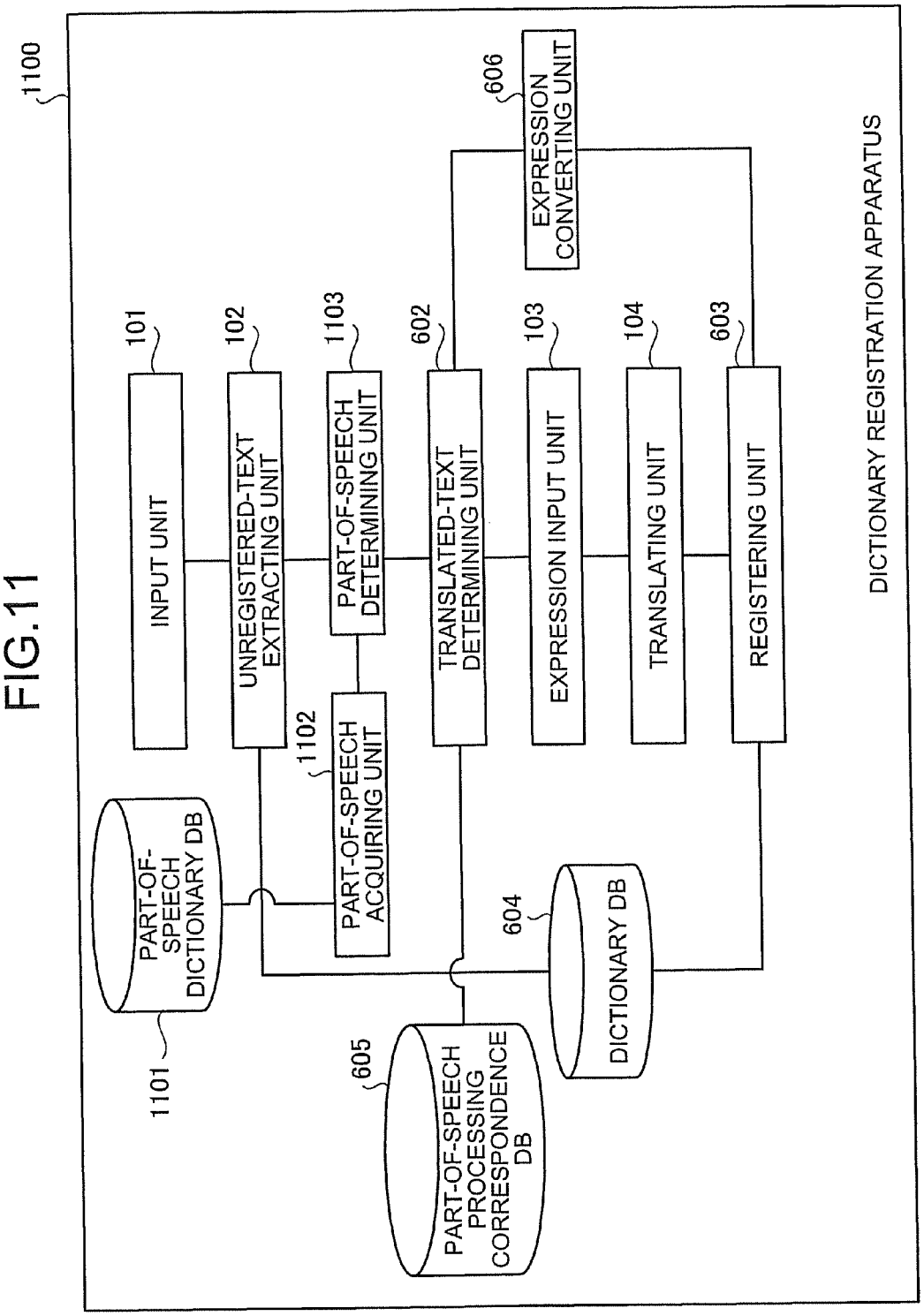
FIG. 11 is a block diagram of a dictionary registration apparatus according to a third embodiment of the present invention.

As shown in FIG. 11, a dictionary registration apparatus 1100 includes the input unit 101, the unregistered-text extracting unit 102, a part-of-speech acquiring unit 1102, a part-of-speech determining unit 1103, the translated-text determining unit 602, the expression input unit 103, the translating unit 104, the registering unit 603, the dictionary DB 604, the part-of-speech processing correspondence DB 605, a part-of-speech dictionary DB 1101, and the expression converting unit 606.

A configuration of the third embodiment is different from that of the second embodiment in that the part-of-speech dictionary DB 1101 and the part-of-speech acquiring unit 1102 are additionally set and the part-of-speech determining unit 601 is replaced by the part-of-speech determining unit 1103 that performs a process different from that of the part-of-speech determining unit 601. Other configurations and functions are the same as those shown in FIG. 6 that is a block diagram of the dictionary registration apparatus 600, and therefore, the same reference numerals are assigned and explanations thereof are omitted.

On a part-of-speech dictionary table stored in the part-of-speech dictionary DB 1101, a Japanese word and a part of speech of the Japanese word are registered by associating with each other. The part-of-speech dictionary table is sufficient if the Japanese word and the part of speech are associated with each other. For example, it is acceptable to use database of a national-language dictionary. By searching the part-of-speech dictionary table, a part of speech of a word that has not been registered on the dictionary table of the dictionary DB 604 can be specified.

The part-of-speech determining unit 1103 determines the part of speech of the unregistered word extracted by the unregistered-text extracting unit 102. The part-of-speech determining unit 1103 outputs the extracted unregistered word to the part-of-speech acquiring unit 1102 explained later. Thereafter, the part-of-speech determining unit 1103 receives the part of speech of the unregistered word input from the part-of-speech acquiring unit 1102, and determines the input part of speech as the part of speech of the unregistered word.

The part-of-speech acquiring unit 1102 searches the part-of-speech dictionary table of the part-of-speech dictionary DB 1101 using the unregistered word input from the part-of-speech determining unit 1103 as a search key, and acquires information about the part of speech associated with the unregistered word. Thereafter, the part-of-speech acquiring unit 1102 associates the acquired information about the part of speech with the unregistered word and outputs them to the part-of-speech determining unit 1103. Accordingly, the part-of-speech determining unit 1103 determines the part of speech of the unregistered word.

As described above, according to the dictionary registration apparatus 1100, the part of speech acquired from the part-of-speech dictionary DB 1101 is determined as the part of speech of the unregistered word. However, a procedure for determining the part of speech of the unregistered word is not thus limited. For example, it is acceptable to configure so that a user specifies or selects the part of speech, or a predetermined part of speech (i.e., neologism or noun) is to be assumed as the unregistered word.

Furthermore, the dictionary registration apparatus 1100 includes the part-of-speech dictionary DB 1101 including the part-of-speech dictionary table in which a Japanese word and a part of speech are associated with each other is included. Therefore, it is possible to determine the part of speech of the unregistered word easily and with high precision. By using the dictionary DB 604 on which the part of speech that has been determined with the above procedures is registered, it is possible to properly perform a translation when translating a sentence including an unregistered word, by the machine translation.

A dictionary registration apparatus according to a fourth embodiment of the present invention acquires candidate texts of the similar expression corresponding to the unregistered word from a Japanese dictionary DB, presents the acquired candidate texts to a user, and determines a candidate text that has been selected by the user from among the presented candidate texts as the similar expression corresponding to the unregistered word.

Figure 12:
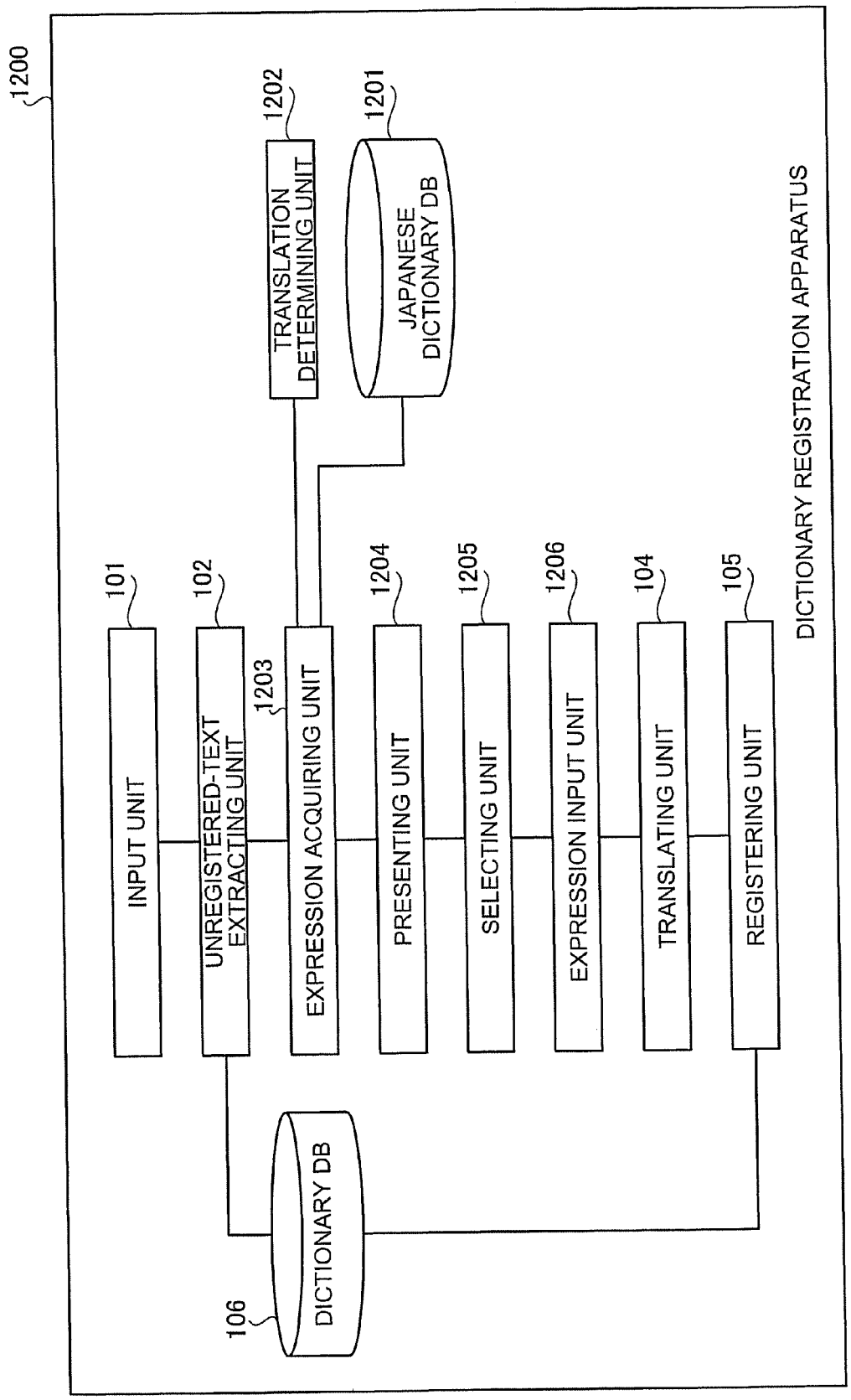
FIG. 12 is a block diagram of a dictionary registration apparatus according to a fourth embodiment of the present invention.

As shown in FIG. 12, a dictionary registration apparatus 1200 includes the input unit 101, the unregistered-text extracting unit 102, an expression acquiring unit 1203, a translation determining unit 1202, a Japanese dictionary DB 1201, a presenting unit 1204, a selecting unit 1205, an expression input unit 1206, the translating unit 104, the registering unit 105, and the dictionary DB 106.

The fourth embodiment is different from the first embodiment in that the expression acquiring unit 1203, the translation determining unit 1202, the Japanese dictionary DB 1201, the presenting unit 1204, and the selecting unit 1205 are additionally set and the expression input unit 103 is replaced by the expression input unit 1206 that performs a different process. Other configurations and functions are the same as those shown in FIG. 1, and therefore, the same reference numerals are assigned and explanations thereof are omitted.

The Japanese dictionary DB 1201 is a national-language dictionary DB on which a Japanese word and an acceptation of the Japanese word are registered by associating with each other. The acceptation is a text with which a word can be understood, that is, a text that expresses a meaning of a word or a word sense. A dictionary used by the expression acquiring unit 1203 explained later is not limited to the Japanese dictionary DB 1201 and can be other dictionaries as long as the dictionaries are arranged separately from the dictionary DB 106 used for the machine translation and include texts to be used as the similar expression to the unregistered word.

The expression acquiring unit 1203 acquires candidate texts of the similar expression corresponding to the extracted unregistered word. According to the fourth embodiment, the expression acquiring unit 1203 searches the national-dictionary table of the Japanese dictionary DB 1201 using the unregistered word as a search key, and outputs the searched acceptation to the translation determining unit 1202 explained later. Thereafter, the expression acquiring unit 1203 determines the acceptation input from the translation determining unit 1202 as a translatable candidate text of the similar expression. If a plurality of the acceptations is extracted, the expression acquiring unit 1203 extracts each of the candidate texts of the similar expression for each of the acceptations.

The translation determining unit 1202 determines whether the acceptation input from the expression acquiring unit 1203 is translatable. The translation determining unit 1202 determines the translatability based on whether a modification relation of the input acceptation is clear, or whether the unregistered word is included. The translation determining unit 1202 outputs the acceptation determined as translatable to the expression acquiring unit 1203.

The presenting unit 1204 presents the candidate text of the similar expression acquired by the expression acquiring unit 1203 to the user. A presentation procedure is, for example, to display each of the candidates of the similar expressions on a monitor (not shown) in a selectable manner.

The selecting unit 1205 selects the candidate text of the similar expression selected by a user, from the similar expressions presented by the presenting unit 1204. For example, if the user selects a proper candidate text as the similar expression from an input interface (I/F), the selecting unit 1205 selects the candidate text as the similar expression.

The expression input unit 1206 receives an input of the selected candidate text of the similar expression as the similar expression corresponding to the unregistered word.

A registration process performed by the dictionary registration apparatus 1200 for registering an unregistered text is explained with reference to FIG. 13.

The input unit 101 receives an input of a Japanese sentence (step S1301).

The unregistered-text extracting unit 102 extracts the unregistered word that has not been registered in the dictionary table of the dictionary DB 106, from the input sentence (step S1302).

The expression acquiring unit 1203 acquires the candidate text of the similar expression from the Japanese dictionary DB 1201 using the extracted unregistered word as a search condition (step S1303). Details will be explained later.

The presenting unit 1204 presents the acquired candidate text of the similar expression to a user (step S1304). The selecting unit 1205 selects the candidate text to be a process target from the presented candidates, in response to an operation performed by the user (step S1305).

The expression input unit 1206 receives an input of the selected candidate text as the similar expression to the unregistered word (step S1306). The translating unit 104 performs a process for translating the input similar expression into English (step S1307).

The registering unit 105 registers the extracted unregistered text and the similar expression translated into English (corresponding translation) on the dictionary DB 106, by associating with each other (step S1308).

Figure 13:
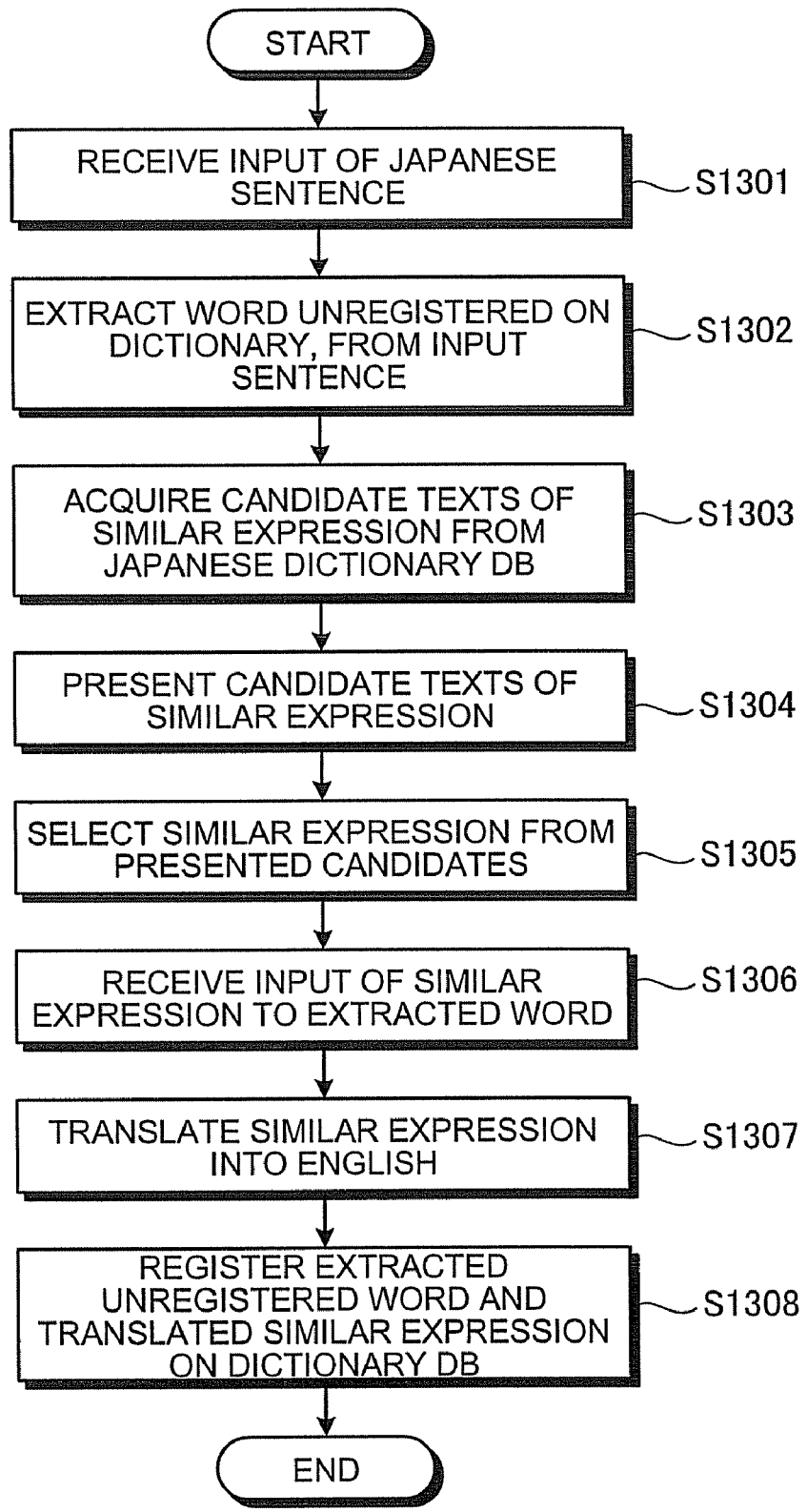
FIG. 13 is a flowchart of a registration processing of registering an unregistered text on the dictionary registration apparatus shown in FIG. 12.
Figure 14:
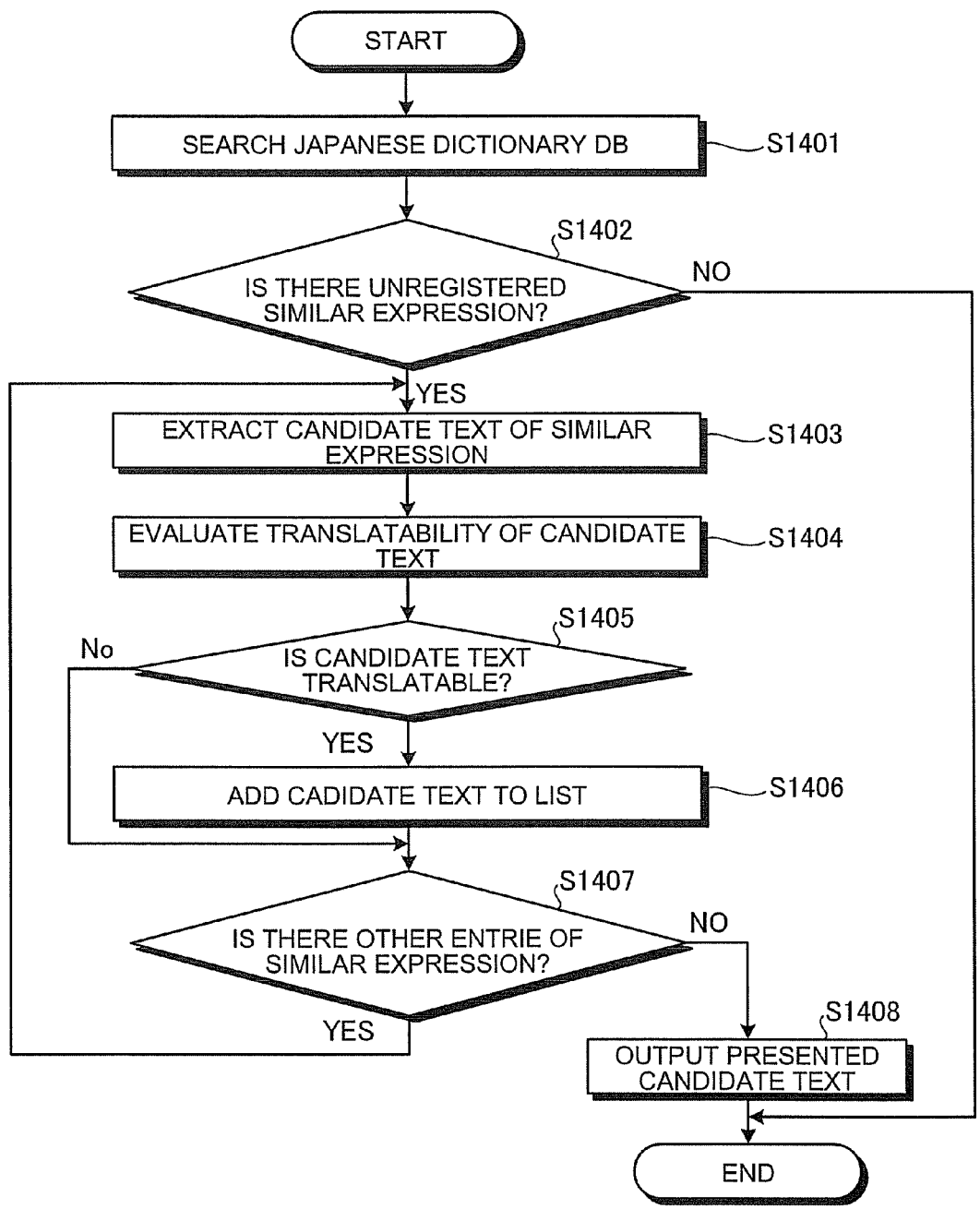
FIG. 14 is a flowchart of a process procedure of acquiring a candidate text of a similar expression corresponding to an unregistered word, performed by an expression acquiring unit shown in FIG. 12.

A process performed by the expression acquiring unit 1203 for acquiring the similar expression to the unregistered word shown at step S1303 in FIG. 13 is explained with reference to FIG. 14.

The expression acquiring unit 1203 searches the Japanese dictionary DB 1201 using such a search condition that the unregistered word is included (step S1401).

The expression acquiring unit 1203 determines whether an entry corresponding to the search condition has been detected (step S1402). If the expression acquiring unit 1203 determines that the entry has not been detected (No at step S1402), a system control terminates.

If the expression acquiring unit 1203 determines that the entry has been detected (Yes at step S1402), an expression acquiring unit 1203a extracts a candidate text of the similar expression from the entry (step S1403). The candidate text extracted by the expression acquiring unit 1203 is output to the translation determining unit 1202. If the expression acquiring unit 1203 determines that a plurality of the acceptations is included in the entry, the expression acquiring unit 1203 outputs each of the candidate texts of the similar expression for each of the acceptations. The extracted candidate text of the similar expression is output to the translation determining unit 1202.

The translation determining unit 1202 determines whether the input candidate text of the similar expression is translatable (step S1404). The translation determining unit 1202 determines whether the candidate text of the similar expression is translatable based on a result of the determination (step S1405). Upon determining that the candidate text is not translatable (No at step S1405), the translation determining unit 1202 does not determine the candidate text as the similar expression and does not perform any processes.

If the translation determining unit 1202 determines that the candidate text is translatable (Yes at step S1405), the translation determining unit 1202 outputs the candidate text of the similar expression to the expression acquiring unit 1203. Accordingly, the expression acquiring unit 1203 adds the input text to a buffer, as the candidate of the similar expression to be presented to the user (step S1406).

Thereafter, the expression acquiring unit 1203 determines whether there are other detected entries (step S1407). Upon determining that there are other entries (Yes at step S1407), the expression acquiring unit 1203 re-extracts candidate texts (step S1403).

Upon determining that there are no other entries (No at step S1408), the expression acquiring unit 1203 outputs the candidate texts of the similar expressions sequentially stored in the buffer to the presenting unit 1204 (step S1408).

According to the fourth embodiment, a user can select the similar expression corresponding to the unregistered text without receiving an input of the similar expression. The dictionary registration apparatus 1200 registers a translated text of the selected similar expression by associating it with the unregistered text. Accordingly, the user can register the unregistered text and the translated text corresponding to the unregistered text with an easy operation.

Furthermore, according to the fourth embodiment, it is determined whether the similar expression is translatable and the translatable similar expressions are exclusively presented as the candidate texts. According to the above process, it is possible to present the candidate text of the translatable similar expression to the user. Accordingly, the similar expression selected by the user can be assumed to be successfully translated, and therefore, it is possible to register a precise translated text by associating it with the unregistered text.

A dictionary registration apparatus according to a fifth embodiment receives a correction of the similar expression from a user and performs a translation of the corrected similar expression, if the translation of the similar expression to the unregistered word is failed.

Figure 15:
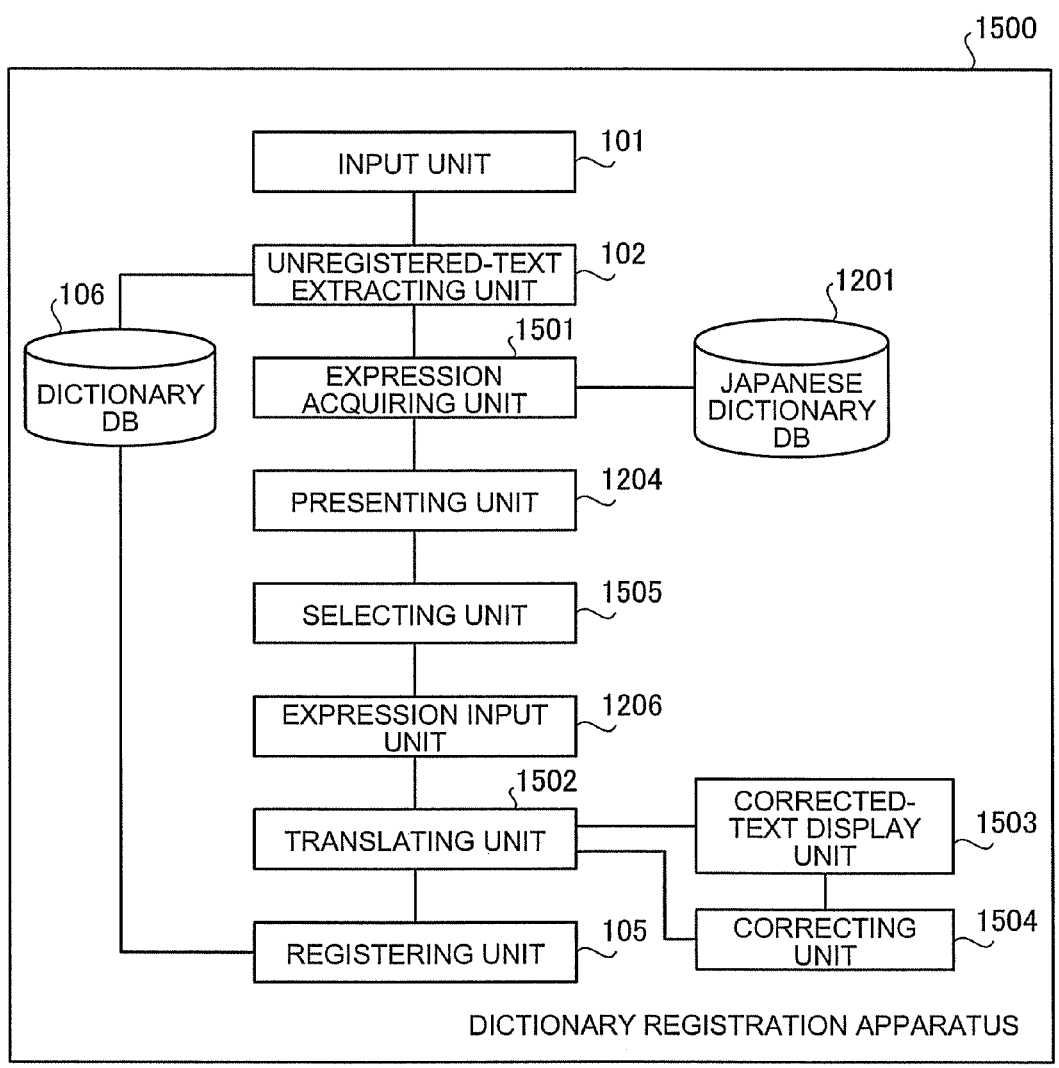
FIG. 15 is a block diagram of a dictionary registration apparatus according to a fifth embodiment of the present invention.

As shown in FIG. 15, a dictionary registration apparatus 1500 includes the input unit 101, the unregistered-text extracting unit 102, an expression acquiring unit 1501, the Japanese dictionary DB 1201, the presenting unit 1204, a selecting unit 1505, the expression input unit 1206, a translation unit 1502, a corrected-text display unit 1503, a correcting unit 1504, the registering unit 105, and the dictionary DB 106.

The fifth embodiment of the present invention is different from the fourth embodiment in that the corrected-text display unit 1503 and the correcting unit 1504 are additionally set, the translation determining unit 1202 is removed, the expression acquiring unit 1203 is replaced by the expression acquiring unit 1501 that performs a different process, the selecting unit 1205 is replaced by the selecting unit 1505 that performs a different process, and the translating unit 104 is replaced by the translating unit 1502 that performs a different process. Other configurations and functions are the same as those shown in FIG. 12 that is a block diagram of the dictionary registration apparatus 1200, and therefore, the same reference numerals are assigned and explanations thereof are omitted.

The expression acquiring unit 1501 acquires the candidate text of the similar expression corresponding to the extracted unregistered word. According to the fifth embodiment, the expression acquiring unit 1501 searches the Japanese dictionary DB 1201 using the unregistered word as a search key, and determines the detected acceptation as the candidate text of the similar expression. If there is a plurality of the detected acceptations, the expression acquiring unit 1501 extracts each of the candidate text of the similar expression for each of the acceptations. The fifth embodiment is different from the fourth embodiment in that it is not required to determine the translatability.

The selecting unit 1505 selects the candidate text of the similar expression selected by a user from the candidate texts of the similar expressions presented by the presenting unit 1204. The user can correct the candidate text of the similar expression. In this case, the selecting unit 1505 can select the corrected similar expression.

The translating unit 1502 translates the input similar expression into English (the second language). If the translation of the similar expression is failed, the translating unit 1502 outputs the similar expression and information about a cause of the failure to the corrected-text display unit 1503. The information about the cause is, for example, information indicating that a word that is not on the dictionary for the machine translation has been used.

The corrected-text display unit 1503 displays the similar expression that has not successfully been translated by the translating unit 1502 on a monitor. Upon displaying the similar expression, the corrected-text display unit 1503 presents a portion that has not successfully been translated. Accordingly, the user can easily correct the similar expression. If the information about the cause of the failure in the translation is input from the translating unit 1502, it is acceptable to display the information to the user.

The correcting unit 1504 receives the similar expression corrected by the user. The similar expression received by the correcting unit is translated by the translating unit 1502. If the translation is again failed by the translating unit 1502, the corrected-text display unit 1503 displays the failed similar expression. By repeating the above process procedures until the translation is successfully performed, it is possible to obtain the similar expression as a corresponding translated text of the unregistered word.

When the translation is successfully performed, the translating unit 1502 outputs the similar expression translated into English and the unregistered word to the registering unit 105. Accordingly, the registering unit 105 can register the unregistered word and the translated similar expression on the dictionary table of the dictionary DB 106, by associating with each other.

An example when the translating unit 1502 has failed in the translation is explained in detail. The selecting unit 1505 selects a text of "a cave having stalactite made of ground water" based on the operation performed by the user, as the similar expression corresponding to the unregistered word of "shonyudo" in Japanese.

In this case, the selecting unit 1505 outputs the similar expression "a cave having stalactite made of ground water" to the translating unit 1502.

The translating unit 1502 performs the machine translation for the similar expression "a cave having stalactite made of ground water". It is assumed that the machine translation is failed because the "stalactite" as a part of the similar expression has not been registered on the dictionary DB 106.

In this case, the translating unit 1502 outputs the similar expression "a cave having stalactite made of ground water" and information for specifying the failed portion in the similar expression to the corrected-text display unit 1503.

When the similar expression is input, the corrected-text display unit 1503 performs a process to display the similar expression. The corrected-text display unit 1503 displays a window shown in FIG. 16 on a monitor, and, accordingly, the user can correct the similar expression. The corrected-text display unit 1503 displays a portion of the similar expression in an identifiable manner, by which the translation is failed. In the window shown in FIG. 16, the portion corresponding to the "shonyuseki" is highlighted in a different color. Accordingly, the user can specify that the "shonyuseki" is a cause of the failure.

Figure 16:
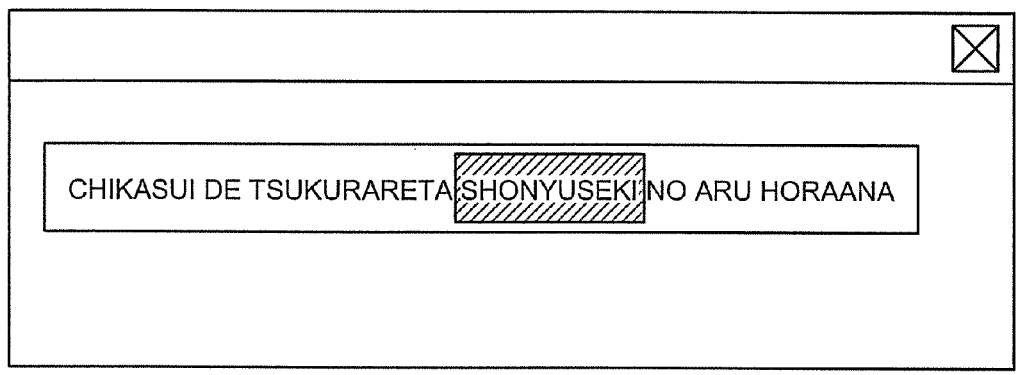
FIG. 16 is an example of a window displayed by a correction-portion display unit shown in FIG. 15.
Figure 17:
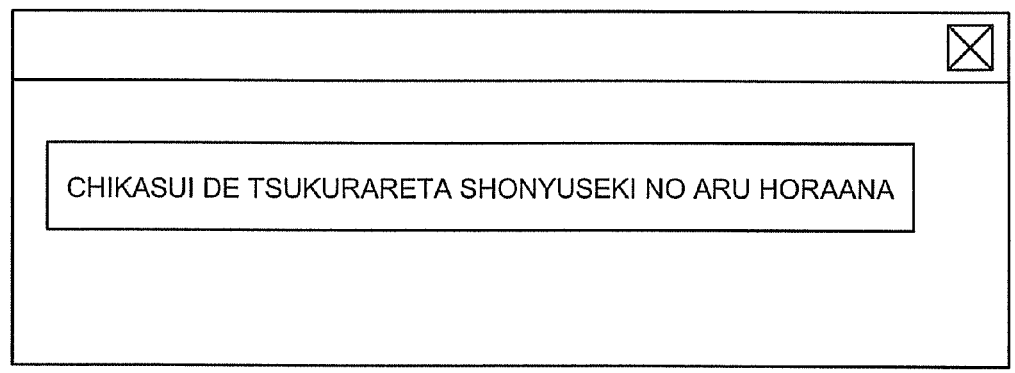
FIG. 17 is an example of a window displayed by a correction-portion display unit in a modification of the dictionary registration apparatus shown in FIG. 15.

Although it is not shown in FIG. 16, it is acceptable to display the information indicating the cause of the failure in the translation on the window. Further, although it is different from the fifth embodiment, it is acceptable not to identifiably display the corrected portion. As shown in FIG. 17, it is acceptable that the corrected-text display unit 1503 does not highlight the portion where the translation has been failed, in a different color, and, alternatively, displays the similar expression on the window. In this case, the user also can correct the similar expression.

Figure 18:
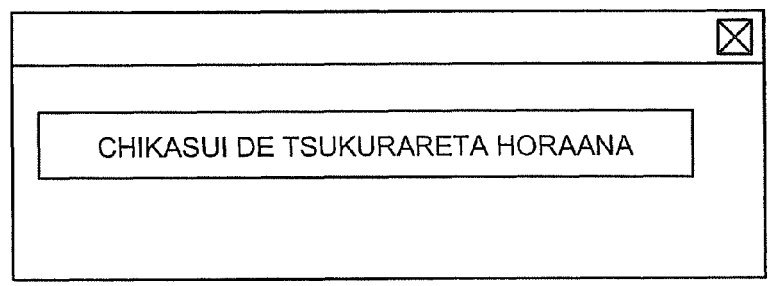
FIG. 18 is an example of a window on which a similar expression corrected by a user is displayed on the dictionary registration apparatus shown in FIG. 15.

Referring back to the explanation of the fifth embodiment, when the above described window is displayed on a monitor, the user corrects the similar expression. The correction can be performed in any procedures, for example, the user can delete the portion where the translation is failed. In the window shown in FIG. 18, it is shown that the correction performed by the user has been accepted.

The correcting unit 1504 corrects the similar expression to "a cave made of ground water" based on the operation performed by the user and outputs the corrected similar expression to the translating unit 1502. In this manner, the user is required to correct the similar expression to prevent the occurrence of a failure in performing the machine translation, and therefore, it is possible to improve the reliability of the translated text to be generated.

It is acceptable that the dictionary registration apparatus 1500 includes the translation determining unit 1202 explained in the fourth embodiment. In this case, the candidate text of the similar expression for which the translation determining unit 1202 has determined as untranslatable can also be presented by the presenting unit 1204, with the portion where the translation is failed specified. In this case, the user rarely selects the candidate text that includes the portion where the translation is failed. On the contrary, the user can select the candidate text of the similar expression, by taking the portion where the translation is failed into account.

As described above, according to the dictionary registration apparatus 1500, it is possible to easily acquire the similar expression suitable for performing the machine translation. Furthermore, if the translation of the similar expression is failed, the similar expression is displayed for the user and the user can correct the portion where the translation is failed in the similar expression. Accordingly, the similar expression can easily be corrected so that the translation is successfully performed.

Figure 19:
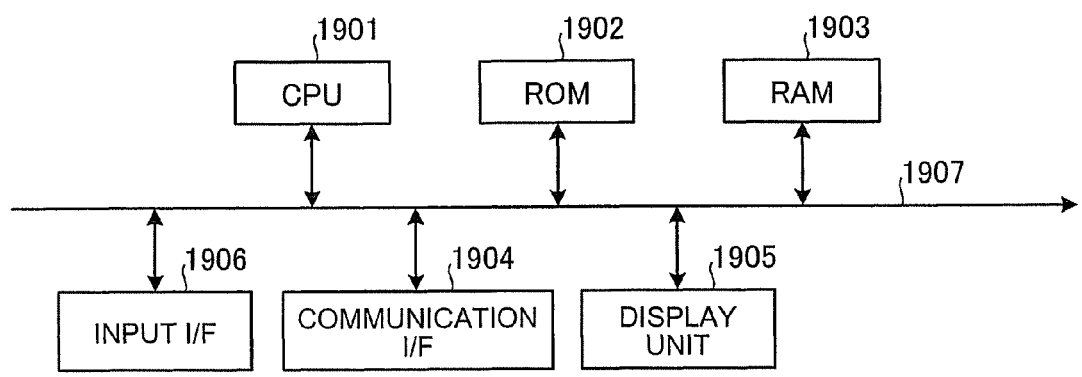
FIG. 19 is a schematic of a hardware configuration of the dictionary registration apparatus shown in FIG. 15.

As shown in FIG. 19, as a hardware configuration, the dictionary registration apparatus according to any one of the first to the fifth embodiments includes a read only memory (ROM) 1902 in which a dictionary registration program and the like for executing a dictionary registration process in the dictionary registration apparatus, a central processing unit (CPU) 1901 that controls each of the units in the dictionary registration apparatus based on the programs in the ROM 1902, a random access memory (RAM) 1903 that stores various data necessary for controlling the dictionary registration apparatus, a communication I/F 1904 that performs the communication in connection with the network, a display unit 1905 that displays a result obtained from a process in the dictionary registration apparatus, an input I/F 1906 that is used by a user, and a bus 1907 for connecting each of the units.

The dictionary registration program to be executed in the dictionary registration apparatus according to any one of the first to the fifth embodiments is stored in a computer-readable recording medium such as compact disc (CD)-ROM, flexible disk, CD-R, digital versatile disk, in a file with a installable format or a executable format, to be provided.

In this case, the dictionary registration program is read out from the above recording medium in the dictionary registration apparatus to be executed, loaded on a main memory, and each of the units explained with the above software configuration is generated on the main memory.

It is acceptable to configure so that the dictionary registration program to be executed on the dictionary registration apparatus according to the first to the fifth embodiments is stored on a computer connected to a network such as the Internet to be provided by downloading via the network. Further, it is acceptable to configure so that the dictionary registration apparatus to be executed on the dictionary registration apparatus is provided or distributed via the network such as the Internet.

It is also acceptable to provide the dictionary registration program according to the above embodiments, by installing in advance in the ROM and the like.

The dictionary registration program to be executed on the dictionary registration apparatus according to the above embodiments has a module configuration including each of the above units. For a real hardware, the CPU (processor) reads out the dictionary registration apparatus from the above recording medium to execute the dictionary registration, each of the above units is loaded on the main memory, and each of the above units are generated on the main memory.

Various modifications of the above embodiments can be made as explained by an example below. For example, according to the above embodiments, the dictionary DB to be a registration target is stored in the dictionary registration apparatus. However, the storage format is not thus limited and any storage formats can be employed as long as the dictionary registration apparatus can register the unregistered text thereto and refers to it when performing the translation. As an example of the modification, the dictionary DB can be stored in a server and the like connected to the dictionary registration apparatus according to the above embodiments via a network. In this modification, the unregistered text can be registered by transmitting and receiving data between the server and the dictionary registration apparatus.

In this manner, the present invention in its broader aspects is not limited to the specific details and representative embodiments shown and described herein. Accordingly, various modifications may be made without departing from the spirit or scope of the general inventive concept as defined by the appended claims and their equivalents. Further, constituent elements explained with the embodiments can arbitrarily be integrated or distributed. For example, some constituent elements can be omitted from the entirety of the elements or constituent elements separately set in different embodiments can be integrated.

As described above, the dictionary registration apparatus, the dictionary registration method, and the computer program for registering texts to the dictionary is suitable for registering the texts including the unregistered words on the dictionary used for performing the machinery translation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A dictionary registration apparatus comprising:
a first storing unit that stores therein dictionary information in which a first text in a first language is associated with a second text that is a translation of the first text into a second language;
a first input unit that receives a first input text in the first language;
an extracting unit that extracts, when the first input text includes an unregistered text that is not registered as the first text in the dictionary information, the unregistered text from the first input text;
a determining unit that determines a part of speech of the unregistered text and that, in accordance with the part of speech, determines whether to convert a pronunciation of the unregistered text into an expression in the second language;
a converting unit that converts the pronunciation of the unregistered text into the expression in the second language when the determining unit determines to convert the pronunciation;
a second input unit that receives a second input text in the first language, the second input text expressing the unregistered text with a text being different from the unregistered text when the determining unit determines not to convert the pronunciation;
a translating unit that translates the second input text into the second language; and
a registering unit that registers the unregistered text in association with the second input text translated into the second language on the dictionary information or that registers the unregistered text in association with text which is the expression in the second language converted from the pronunciation of the unregistered text, on the dictionary information.

2. The apparatus according to claim 1, wherein the determining unit determines the part of speech of the unregistered text based on an arrangement of the unregistered text in the first input text.

3. The apparatus according to claim 1, further comprising:
a second storing unit that stores therein part-of-speech correspondence information in which a first text in a first language is associated with the part of speech of the first text; and
an acquiring unit that acquires a part of speech corresponding to the unregistered text from the part-of-speech correspondence information, wherein
the determining unit determines the part of speech acquired by the acquiring unit as the part of speech corresponding to the unregistered text.

4. The apparatus according to claim 1, wherein the second input unit receives an input of the second input text using the first text that is already registered on the dictionary information.

5. A dictionary registration method comprising:
first inputting including inputting a first input text in a first language;
extracting, when the first input text includes an unregistered text that is not registered as a first text in the first language in dictionary information stored in a first storing unit, in which the first text is associated with a second text that is a translation of the first text into a second language;
determining a part of speech of the unregistered text and, in accordance with the part of speech, determining whether to convert a pronunciation of the unregistered text into an expression in the second language;
converting the pronunciation of the unregistered text into the expression in the second language when it is determined to convert the pronunciation;
second inputting including inputting a second input text in the first language, the second input text expressing the unregistered text with a text being different from the unregistered text when it is determined not to convert the pronunciation;
translating the second input text into the second language; and
registering the unregistered text in association with the second input text translated into the second language on the dictionary information, or registering the unregistered text in association with the text which is the expression in the second language converted from the pronunciation of the unregistered text, on the dictionary information.

6. The method according to claim 5, further comprising:
storing first information in which the first text is associated with the part of speech of the first text;
acquiring a part of speech corresponding to the unregistered text from the first information; and
determining the part of speech acquired at the acquiring as a part of speech corresponding to the unregistered text.

7. A computer-readable recording medium that stores therein a computer program that causes a computer to execute:
first inputting including inputting a first input text in a first language;
extracting, when the first input text includes an unregistered text that is not registered as a first text in the first language in dictionary information stored in a first storing unit, in which the first text is associated with a second text that is a translation of the first text into a second language;

determining a part of speech of the unregistered text and, in accordance with the part of speech, determining whether to convert a pronunciation of the unregistered text into an expression in the second language;

converting the pronunciation of the unregistered text into the expression in the second language when it is determined to convert the pronunciation;

second inputting including inputting a second input text in the first language the second input text expressing the unregistered text with a text being different from the unregistered text when it is determined not to convert the pronunciation;

translating the second input text into the second language; and registering the unregistered text in association with the second input text translated into the second language on the dictionary information, or registering the unregistered text in association with the text which is the expression in the second language converted from the pronunciation of the unregistered text, on the dictionary information.

8. The medium according to claim 7, the computer program further causes the computer to execute storing first information in which the first text is associated with the part of speech of the first text;

acquiring a part of speech corresponding to the unregistered text from the first information; and determining the part of speech acquired at the acquiring as a part of speech corresponding to the unregistered text.

* * * * *